(12) United States Patent
Maenishi et al.

(10) Patent No.: US 9,005,829 B2
(45) Date of Patent: Apr. 14, 2015

(54) HYDROGEN GENERATION APPARATUS, FUEL CELL SYSTEM INCLUDING THE SAME, AND METHOD OF OPERATING HYDROGEN GENERATION APPARATUS

(75) Inventors: Akira Maenishi, Shiga (JP); Hidenobu Wakita, Kyoto (JP); Seiji Fujihara, Osaka (JP); Masaki Nobuoka, Nara (JP); Youji Kawaguchi, Kyoto (JP); Kiyoshi Taguchi, Osaka (JP); Satoru Narita, Osaka (JP); Kunihiro Ukai, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 16 days.

(21) Appl. No.: 14/115,563

(22) PCT Filed: Jun. 7, 2012

(86) PCT No.: PCT/JP2012/003738
§ 371 (c)(1),
(2), (4) Date: Nov. 4, 2013

(87) PCT Pub. No.: WO2012/169199
PCT Pub. Date: Dec. 13, 2012

(65) Prior Publication Data
US 2014/0072892 A1    Mar. 13, 2014

(30) Foreign Application Priority Data

Jun. 8, 2011  (JP) .................................. 2011-127870
Nov. 14, 2011  (JP) .................................. 2011-248330

(51) Int. Cl.
*H01M 8/06* (2006.01)
*H01M 8/18* (2006.01)
(Continued)

(52) U.S. Cl.
CPC .............. *C01B 3/38* (2013.01); *H01M 8/0612* (2013.01); *H01M 8/0675* (2013.01);
(Continued)

(58) Field of Classification Search
CPC  H01M 8/0606; H01M 8/0612; H01M 8/0675
USPC .................................. 429/415, 416, 423, 425
See application file for complete search history.

(56) References Cited

U.S. PATENT DOCUMENTS

2014/0072888 A1    3/2014  Harada et al.

FOREIGN PATENT DOCUMENTS

EP            2518012 A1        10/2012
EP            2518013 A1        10/2012
(Continued)

OTHER PUBLICATIONS

Extended European Search Report issued in corresponding European Application No. 12796524.2, dated Feb. 27, 2014.
(Continued)

*Primary Examiner* — Helen O Conley
(74) *Attorney, Agent, or Firm* — McDermott Will & Emery LLP (57) ABSTRACT

A hydrogen generation apparatus including: a first desulfurizer; a second desulfurizer; a reformer to generate a hydrogen-containing reformed gas from a raw material gas from which sulfur has been removed by at least one of the first desulfurizer and the second desulfurizer; and a recycle passage through which a part of the reformed gas generated by the reformer is mixed into the raw material gas to be supplied to the second desulfurizer. After installation or maintenance of the hydrogen generation apparatus, the raw material gas is supplied to the reformer through the first desulfurizer until a catalyst in the second desulfurizer is activated by a mixed gas of the reformed gas supplied through the recycle passage and the raw material gas, and after the catalyst in the second desulfurizer is activated, the raw material gas is supplied to the reformer through the second desulfurizer.

14 Claims, 4 Drawing Sheets

(51) Int. Cl.
  *C01B 3/38* (2006.01)
  *H01M 8/04* (2006.01)
  *B01J 8/04* (2006.01)
  *B01J 8/00* (2006.01)

(52) U.S. Cl.
  CPC ..... *H01M 8/04373* (2013.01); *H01M 8/04776* (2013.01); *C01B 2203/0233* (2013.01); *C01B 2203/0244* (2013.01); *C01B 2203/044* (2013.01); *C01B 2203/047* (2013.01); *C01B 2203/066* (2013.01); *C01B 2203/0827* (2013.01); *C01B 2203/1047* (2013.01); *C01B 2203/1258* (2013.01); *C01B 2203/127* (2013.01); *C01B 2203/148* (2013.01); *C01B 2203/1604* (2013.01); *C01B 2203/82* (2013.01); *Y02E 60/50* (2013.01); *B01J 8/0469* (2013.01); *B01J 8/0492* (2013.01); *B01J 8/0496* (2013.01); *B01J 8/001* (2013.01); *B01J 8/0465* (2013.01); *B01J 2208/00504* (2013.01); *B01J 2208/0053* (2013.01); *B01J 2208/00628* (2013.01); *B01J 2208/00646* (2013.01); *B01J 2208/025* (2013.01); *H01M 8/0606* (2013.01)

(56) References Cited

FOREIGN PATENT DOCUMENTS

| | | |
|---|---|---|
| JP | 01-275697 A | 11/1989 |
| JP | 2003-017109 A | 1/2003 |
| JP | 2003-272691 A | 9/2003 |
| JP | 2006-008459 A | 1/2006 |
| JP | 2006-092764 A | 4/2006 |
| JP | 2009-249203 A | 10/2009 |
| JP | 2010-044885 A | 2/2010 |
| WO | 2009-061072 A1 | 5/2009 |
| WO | 2012-164897 A1 | 12/2012 |

OTHER PUBLICATIONS

International Search Report issued in PCT/JP2012/003738, dated Sep. 18, 2012.

HYDROGEN GENERATION APPARATUS, FUEL CELL SYSTEM INCLUDING THE SAME, AND METHOD OF OPERATING HYDROGEN GENERATION APPARATUS

RELATED APPLICATIONS

This application is the U.S. National Phase under 35 U.S.C. §371 of International Application No. PCT/JP2012/003738, filed on Jun. 7, 2012, which in turn claims the benefit of Japanese Application No. 2011-248330, filed on Nov. 14, 2011, which in turn claims the benefit of Japanese Application No. 2011-127870, filed on Jun. 8, 2011, the disclosures of which Applications are incorporated by reference herein.

TECHNICAL FIELD

The present invention relates to a hydrogen generation apparatus, a fuel cell system including the same, and a method of operating the hydrogen generation apparatus.

BACKGROUND ART

Hydrogen generation apparatuses include a reformer and a carbon monoxide reducer. The reformer causes a steam reforming reaction between a raw material gas and steam with use of a reforming catalyst, thereby generating a reformed gas whose components include hydrogen, methane, carbon monoxide, carbon dioxide, and steam. Here, a hydrocarbon-based fuel such as natural gas or LPG is used as the raw material gas. The carbon monoxide reducer reduces carbon monoxide in the reformed gas with use of a shift conversion catalyst and/or a selective oxidation catalyst.

The natural gas or LPG used as the raw material gas contains sulfur compounds. The sulfur compounds include those originally contained in the raw material gas when extracted and those added to the raw material gas as odorants for leakage detection purposes. These sulfur compounds are, for example, DMS (sulfides), TBM (mercaptans), and THT (thiophenes). If the sulfur compounds are fed to the reforming catalyst, the shift conversion catalyst, or the selective oxidation catalyst, then the catalyst's active site becomes covered, which hinders the catalyst's performance.

For this reason, from the raw material gas to be supplied to a hydrogen generation apparatus in which catalysts are used, the sulfur compounds need to be removed in advance so that the raw material gas will contain almost no sulfur compounds. Major methods used to remove the sulfur compounds from the raw material gas include: an adsorption desulfurization method in which the sulfur compounds are physically adsorbed within a desulfurization agent without being converted; and a hydrodesulfurization method in which the sulfur compounds are reacted with hydrogen, so that the sulfur compounds are converted into hydrogen sulfide, and the hydrogen sulfide is adsorbed to an adsorption catalyst.

For household fuel cell systems using a hydrogen generation apparatus, it is necessary to reduce the maintenance of the apparatus as much as possible so that the hydrogen generation apparatus can be used for 10 years or longer. When the adsorption desulfurization method and the hydrodesulfurization method are compared in terms of desulfurization agent usage, the hydrodesulfurization method requires a smaller amount of desulfurization agent to remove the same amount of sulfur compounds (e.g., the amount of usage of a hydrodesulfurization agent is a fraction of the amount of usage of an adsorption desulfurization agent).

Accordingly, one known desulfurization system for desulfurizing a raw fuel for use in producing a hydrogen fuel for a fuel cell is configured such that, when starting up, the desulfurization system removes sulfur compounds from a raw material by using a normal-temperature desulfurizer, and thereafter, when the desulfurization system has become a state where a hydrodesulfurizer can be used, the desulfurization system uses the hydrodesulfurizer instead of the normal-temperature desulfurizer to remove sulfur compounds from the raw material (see Patent Literature 1, for example).

CITATION LIST

Patent Literature

PTL 1: Japanese Laid-Open Patent Application Publication No. 2009-249203

SUMMARY OF INVENTION

Technical Problem

A desulfurization agent for use in a hydrodesulfurization method includes: a catalyst for converting sulfur compounds into hydrogen sulfide with supply of hydrogen (e.g., a Co—Mo based or Cu—Zn based catalyst); and a catalyst for chemisorbing the hydrogen sulfide (a ZnO based or Cu—Zn based catalyst). When a Cu—Zn based catalyst is to be used, the catalyst needs to be in a reduced state. Therefore, in general, after a Cu—Zn catalyst is incorporated into a hydrogen generation apparatus, the Cu—Zn catalyst is heated to a temperature of 200° C. or higher and hydrogen is supplied thereto, so that the Cu—Zn catalyst is reduced in a hydrogen atmosphere. It should be noted that when the Cu—Zn catalyst is reduced, the Cu—Zn catalyst generates heat due to a reaction with hydrogen.

Meanwhile, if a catalyst is heated excessively, then a phenomenon called sintering occurs, causing a decrease in catalytic activity. Sintering of a Cu—Zn catalyst occurs at a temperature of 300° C. or higher. Generally speaking, in a hydrogen generation apparatus, a heat insulating material is disposed around the catalyst in order to improve thermal efficiency, and therefore, heat is not easily dissipated. For this reason, when the reduction of a Cu—Zn catalyst is performed, it is necessary to control a hydrogen supply amount so as not to cause the temperature of the catalyst to reach a temperature at which the sintering of the catalyst occurs, while maintaining a minimum required temperature by means of a heater or the like.

Accordingly, if a Cu—Zn catalyst in a hydrogen generation apparatus is to be reduced before a fuel cell system is completed as a final product, a reductor for performing the catalyst reduction in the production process is necessary. Moreover, a substantial amount of time is necessary for reducing the catalyst. Furthermore, infrastructure costs, such as a cost for supplying hydrogen gas to be used in the reduction and an electricity cost for operating the reductor, are necessary. The reductor, the time necessary for the reduction, the infrastructure costs for operating the apparatus, etc., are cost factors that increase the price of the product.

An object of the present invention is to provide a hydrogen generation apparatus including a hydrodesulfurization agent that needs to be reduced, the hydrogen generation apparatus realizing cost reduction by being configured to perform the reduction of a Cu—Zn catalyst after the installation of the hydrogen generation apparatus, and to provide a fuel cell system including the hydrogen generation apparatus and a method of operating the hydrogen generation apparatus.

Solution to Problem

In order to solve the above conventional problems, a hydrogen generation apparatus according to the present invention includes: a first desulfurizer configured to remove a sulfur component from a raw material gas at a normal temperature; a second desulfurizer configured to remove the sulfur component from the raw material gas by hydrogenating the sulfur component; a reformer configured to generate a hydrogen-containing reformed gas from the raw material gas from which sulfur has been removed by at least one of the first desulfurizer and the second desulfurizer; and a recycle passage through which a part of the reformed gas generated by the reformer is mixed into the raw material gas that is to be supplied to the second desulfurizer. The hydrogen generation apparatus is configured such that after installation or maintenance of the hydrogen generation apparatus, the raw material gas is supplied to the reformer through the first desulfurizer until a catalyst in the second desulfurizer is activated by a mixed gas of the reformed gas supplied through the recycle passage and the raw material gas, and after the catalyst in the second desulfurizer is activated, the raw material gas is supplied to the reformer through the second desulfurizer.

The above configuration eliminates the necessity of performing a reduction treatment before use of the hydrogen generation apparatus, and makes it possible to lower the cost of the hydrogen generation apparatus.

The above object, other objects, features, and advantages of the present invention will be made clear by the following detailed description of preferred embodiments with reference to the accompanying drawings.

Advantageous Effects of Invention

According to the hydrogen generation apparatus, the fuel cell system including the hydrogen generation apparatus, and the method of operating the hydrogen generation apparatus of the present invention, catalyst reduction of the hydrogen generation apparatus including a catalyst that needs to be reduced is performed after installation of the hydrogen generation apparatus, and thereby cost reduction can be realized.

DESCRIPTION OF EMBODIMENTS

Hereinafter, preferred embodiments of the present invention are described with reference to the drawings. In the drawings, the same or corresponding components are denoted by the same reference signs, and a repetition of the same description is avoided. In the drawings, there are cases where only the components necessary for describing the present invention are shown, and the other components are omitted. Further, the present invention is not limited by the embodiments described below.

(Embodiment 1)

A hydrogen generation apparatus according to Embodiment 1 serves as an example where the hydrogen generation apparatus includes: a first desulfurizer configured to remove a sulfur component from a raw material gas at a normal temperature; a second desulfurizer configured to remove the sulfur component from the raw material gas by hydrogenating the sulfur component; a reformer configured to reform water and the raw material gas from which sulfur has been removed by at least one of the first desulfurizer and the second desulfurizer into a hydrogen-containing reformed gas by using a reforming catalyst; and a recycle passage through which a part of the reformed gas from the reformer is mixed into the raw material gas that is to be supplied to the second desulfurizer. The hydrogen generation apparatus is configured such that after installation or maintenance of the hydrogen generation apparatus, the raw material gas is supplied to the reformer through the first desulfurizer until a catalyst in the second desulfurizer is activated by a mixed gas of the reformed gas supplied through the recycle passage and the raw material gas, and after the catalyst in the second desulfurizer is activated, the raw material gas is supplied to the reformer through the second desulfurizer.

The hydrogen generation apparatus according to Embodiment 1 may include: a switch configured to switch a supply destination of the raw material gas between the first desulfurizer and the second desulfurizer; and a controller. The controller may be configured such that after installation or maintenance of the hydrogen generation apparatus, the controller controls the switch to supply the raw material gas to the first desulfurizer and to cause the second desulfurizer to be reduced by the reformed gas until at least one of a cumulative value indicating an accumulated supply amount of the raw material gas supplied to the hydrogen generation apparatus, a cumulative value indicating an accumulated supply time of the raw material gas supplied to the hydrogen generation apparatus, and a cumulative value indicating an accumulated operating time of the hydrogen generation apparatus has become greater than or equal to a corresponding predetermined first threshold.

A hydrogen generation apparatus operating method according to Embodiment 1 is a method of operating a hydrogen generation apparatus including: a first desulfurizer configured to remove a sulfur component from a raw material gas at a normal temperature; a second desulfurizer configured to remove the sulfur component from the raw material gas by hydrogenating the sulfur component; a reformer configured to reform water and the raw material gas from which sulfur has been removed by at least one of the first desulfurizer and the second desulfurizer into a hydrogen-containing reformed gas by using a reforming catalyst; and a recycle passage through which a part of the reformed gas from the reformer is mixed into the raw material gas that is to be supplied to the second desulfurizer. The method includes the steps of: mounting the second desulfurizer including a non-reduced catalyst in the hydrogen generation apparatus; installing the hydrogen generation apparatus; and after the hydrogen generation apparatus is installed, supplying the raw material gas to the first desulfurizer and reducing the second desulfurizer by the reformed gas.

Hereinafter, with reference to FIG. 1 and FIG. 2, a description is given of an example of the hydrogen generation apparatus according to Embodiment 1 and a fuel cell system including the hydrogen generation apparatus according to Embodiment 1.

[Configuration of Fuel Cell System]

Figure 1:
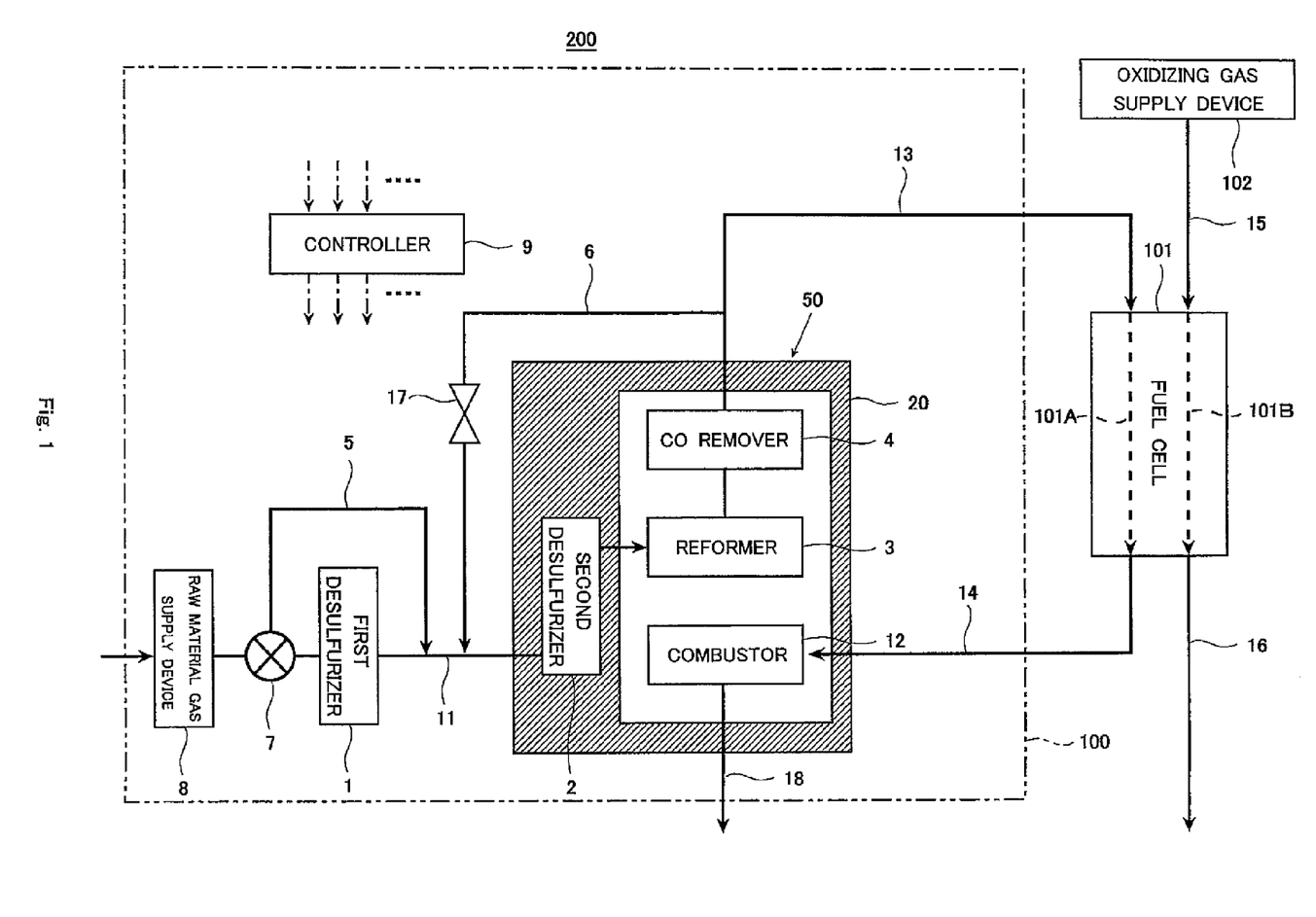
FIG. 1 is a block diagram schematically showing the configuration of a fuel cell system including a hydrogen generation apparatus according to Embodiment 1.

FIG. 1 is a block diagram schematically showing the configuration of the fuel cell system including the hydrogen generation apparatus according to Embodiment 1.

As shown in FIG. 1, a fuel cell system 200 including a hydrogen generation apparatus 100 according to Embodiment 1 includes a fuel cell 101 and an oxidizing gas supply device 102. The fuel cell 101 includes a fuel gas passage 101A and an oxidizing gas passage 101B. For example, a polymer electrolyte fuel cell can be used as the fuel cell 101. Since the configuration of the fuel cell 101 used in Embodiment 1 is the same as that of a general fuel cell, a detailed description of the configuration of the fuel cell 101 is omitted.

The hydrogen generation apparatus 100 is connected to the fuel gas passage 101A of the fuel cell 101 via a fuel gas supply passage 13. The oxidizing gas supply device 102 is connected to the oxidizing gas passage 101B of the fuel cell 101 via an oxidizing gas supply passage 15.

A fuel gas generated by the hydrogen generation apparatus 100 flows through the fuel gas supply passage 13 and the fuel gas passage 101A, and is supplied to the anode (not shown) of the fuel cell 101. An oxidizing gas from the oxidizing gas supply device 102 flows through the oxidizing gas supply passage 15 and the oxidizing gas passage 101B of the fuel cell 101, and is supplied to the cathode (not shown) of the fuel cell 101.

In the fuel cell 101, the fuel gas supplied to the anode and the oxidizing gas supplied to the cathode react with each other, and thereby electricity and heat are generated. It should be noted that the generated electricity is supplied to an external electrical load (e.g., a household electrical appliance) via a power conditioner which is not shown. Also, the generated heat is recovered by a heating medium flowing through a heating medium passage which is not shown. The heat recovered by the heating medium can be used for heating water, for example.

The fuel gas that has not been used in the fuel cell 101 (hereinafter, an off gas) flows through a fuel gas discharge passage 14, and is supplied to a combustor 12 of the hydrogen generation apparatus 100, so that the off gas is used as a combustion fuel. Also, the oxidizing gas that has not been used in the fuel cell 101 flows through an oxidizing gas discharge passage 16, and is discharged to the outside of the fuel cell system 200.

[Configuration of Hydrogen Generation Apparatus]

Next, the hydrogen generation apparatus 100 according to Embodiment 1 is described with reference to FIG. 1 and FIG. 2.

First, a schematic configuration of the hydrogen generation apparatus 100 is described with reference to FIG. 1.

The hydrogen generation apparatus 100 includes a first desulfurizer 1, a second desulfurizer 2, a reformer 3, and a recycle passage 6. The hydrogen generation apparatus 100 is configured such that, after installation or maintenance of the hydrogen generation apparatus 100, a raw material gas is supplied to the reformer 3 through the first desulfurizer 1 until a catalyst in the second desulfurizer 2 is activated by a mixed gas of a reformed gas supplied through the recycle passage 6 and the raw material gas, and after the catalyst in the second desulfurizer 2 is activated, the raw material gas is supplied to the reformer 3 through the second desulfurizer 2.

Specifically, in the hydrogen generation apparatus 100 according to Embodiment 1, the second desulfurizer 2 prior to the installation of the hydrogen generation apparatus 100, or the second desulfurizer 2 that has been replaced with a new one as a result of maintenance, is in a state where the catalyst in the second desulfurizer 2 has not been reduced. The hydrogen generation apparatus 100 according to Embodiment 1 is configured such that the catalyst in the second desulfurizer 2 is reduced at the time of operating the hydrogen generation apparatus 100, i.e., at the time of operating the fuel cell system 200.

In the hydrogen generation apparatus 100, a heat insulating material 20 is disposed so as to surround the second desulfurizer 2, the reformer 3, a CO remover 4, and the combustor 12. It should be noted that, in the description below, devices such as the second desulfurizer 2, the reformer 3, the CO remover 4, the combustor 12, and the heat insulating material 20 are collectively referred to as a hydrogen generator 50.

The reformer 3 is supplied with the raw material gas through a raw material gas supply passage 11. A raw material gas supply device 8 is connected to the upstream end of the raw material gas supply passage 11. An infrastructure for supplying natural gas, LPG, or the like, which is a raw material gas source, is connected to the raw material gas supply device 8.

The raw material gas supply device 8 is configured to supply the raw material gas from the raw material gas source to the reformer 3 while adjusting the flow rate of the raw material gas. For example, the raw material gas supply device 8 includes at least one of a booster and a flow rate adjusting valve. The booster is a booster pump, for example.

It should be noted that the raw material gas supply device 8 realizes part of functions including: supplying the raw material gas and stopping the supply of the raw material gas; measuring the flow rate of the raw material gas; and controlling the flow rate of the raw material gas. Although in Embodiment 1 the raw material gas supply device 8 is disposed upstream from the first desulfurizer 1, the position of the raw material gas supply device 8 is not thus limited. As an alternative, the raw material gas supply device 8 may be disposed on a portion of the raw material gas supply passage 11, the portion extending between a position where the second desulfurizer 2 is provided and a position where the downstream end of the recycle passage 6 is connected to the raw material gas supply passage 11. A hydrocarbon-based fuel such as natural gas or LPG can be used as the raw material gas.

On the raw material gas supply passage 11, the first desulfurizer 1 and the second desulfurizer 2 are sequentially arranged in said order. The first desulfurizer 1 is packed with an adsorption desulfurization agent that removes sulfur compounds at normal temperatures. For example, activated carbon, zeolite, or a metal compound can be used as the adsorption desulfurization agent. An adsorption desulfurization agent capable of exerting its performance at both operating temperatures and non-operating temperatures of the hydrogen generation apparatus 100 is used.

The second desulfurizer 2 is packed with a hydrodesulfurization agent that hydrogenates and chemisorbs sulfur compounds through a reaction with hydrogen. The hydrodesulfurization agent includes: a hydrogen sulfide former for forming hydrogen sulfide through a hydrogenation reaction; and a hydrogen sulfide adsorbent for adsorbing the hydrogen sulfide. A catalyst whose main component is Cu—Zn and which needs to be reduced in order to exert its catalytic function is used as the hydrodesulfurization agent.

Specifically, when initially packed in the hydrogen generation apparatus 100, the hydrodesulfurization agent of the second desulfurizer 2 is in a state of being entirely or partially oxidized by oxygen in air in an air atmosphere. In order for the hydrodesulfurization agent to exert its performance, it is necessary to increase the temperature of the second desulfurizer 2 to perform a reduction treatment in a hydrogen atmosphere.

On the raw material gas supply passage 11, a switch 7 is provided upstream from the first desulfurizer 1. The upstream end of a bypass line (bypass passage) 5 is connected to the switch 7. The downstream end of the bypass line 5 is connected to a portion of the raw material gas supply passage 11, the portion being downstream from the first desulfurizer 1.

The switch 7 is configured to switch the destination of the gas flowing through the raw material gas supply passage 11, such as the raw material gas, between the first desulfurizer 1 and the second desulfurizer 2. The switch 7 is a three-way valve, for example. Alternatively, on-off valves can be used as the switch 7. In this alternative case, the upstream end of the bypass line 5 is connected to a portion of the raw material gas supply passage 11, the portion being upstream from the first desulfurizer 1; one on-off valve is provided on the bypass line 5; and another on-off valve is provided on a portion of the raw material gas supply passage 11, the portion extending between a position where the first desulfurizer 1 is provided and a position where the upstream end of the bypass line 5 is connected to the raw material gas supply passage 11. It should be noted that a still another on-off valve may be provided on a portion of the raw material gas supply passage 11, the portion extending between the position where the first desulfurizer 1 is provided and a position where the downstream end of the bypass line 5 is connected to the raw material gas supply passage 11.

The downstream end of the recycle passage 6 is connected to a portion of the raw material gas supply passage 11, the portion extending between the position where the second desulfurizer 2 is provided and the position where the downstream end of the bypass line 5 is connected to the raw material gas supply passage 11. The upstream end of the recycle passage 6 is connected to a non-end portion of the fuel gas supply passage 13. An on-off valve 17 is provided on the recycle passage 6.

The reformer 3 includes a reforming catalyst. Any material may be used as the reforming catalyst, so long as the material is capable of catalyzing a steam reforming reaction that causes a hydrogen-containing gas to be generated from, for example, a raw material and steam. A noble metal such as Pt, Ru, or Rh, or a base metal such as Ni, can be used as the reforming catalyst. Moreover, a catalyst capable of catalyzing an autothermal reforming reaction may be used as the reforming catalyst of the reformer 3.

In the reformer 3, a CO-containing reformed gas with a high hydrogen concentration is generated through a reforming reaction between the raw material gas supplied from the raw material gas supply device 8 and separately supplied steam. The supplied raw material gas is in a state where sulfur compounds (sulfur components) have been removed. The generated reformed gas is supplied to the CO remover 4.

The CO remover 4 is configured to remove CO from the reformed gas. Examples of the CO remover 4 include: a shift converter including a shift conversion catalyst (e.g., Fe-Cr catalyst or Cu—Zn catalyst); and a selective oxidizer including an oxidation catalyst (e.g., ruthenium-based catalyst). The reformed gas from which CO has been removed by the CO remover 4 is supplied to the fuel cell 101 as a fuel gas. It should be noted that the CO remover 4 may include a methanation catalyst.

As described above, the off gas that has not been used in the fuel cell 101 (i.e., combustion fuel) is supplied to the combustor 12. The combustor 12 is configured as a burner or a combustion catalyst, for example. In the combustor 12, the off gas and separately supplied air (oxygen) are combusted, and thereby a flue gas is generated. The generated flue gas flows through a flue gas passage 18, and is discharged to the outside of the fuel cell system 200. It should be noted that heat generated when the flue gas is generated heats up the second desulfurizer 2, the reformer 3, and the CO remover 4. At the start-up of the hydrogen generation apparatus 100 (i.e., at the start-up of the fuel cell system 200), the raw material gas is supplied to the combustor 12.

The hydrogen generation apparatus 100 includes a controller 9 which may be configured as any device, so long as the device is configured to control component devices of the hydrogen generation apparatus 100. The controller 9 includes: an arithmetic processing unit exemplified by a microprocessor, CPU, or the like; a storage unit configured as a memory or the like storing programs for performing control operations; and a timer unit having a clock function. Through the loading and execution, by the arithmetic processing unit, of a predetermined control program stored in the storage unit, the controller 9 performs various controls of the hydrogen generation apparatus 100.

It should be noted that the controller 9 may be configured not only as a single controller, but as a group of multiple controllers which operate in cooperation with each other to control the hydrogen generation apparatus 100. The controller 9 is configured to also control component devices of the fuel cell system 200. Moreover, the controller 9 may be configured as a microcontroller. Furthermore, the controller 9 may be configured as an MPU, PLC (Programmable Logic Controller), logic circuit, or the like.

Next, the configuration of the hydrogen generation apparatus 100 (to be exact, the hydrogen generator 50) is described in more detail with reference to FIG. 2.

Figure 2:
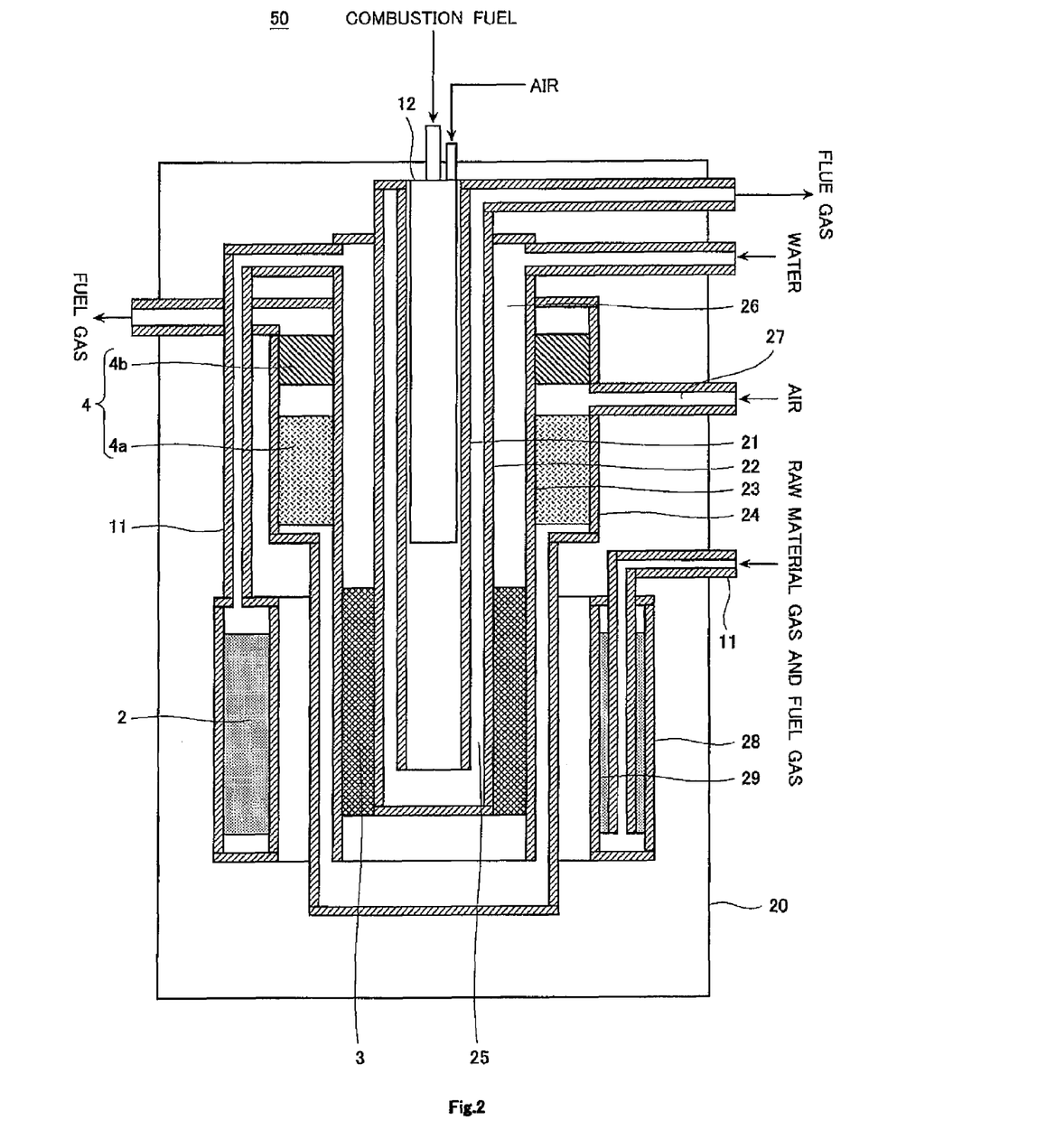
FIG. 2 is a cross-sectional view showing a schematic configuration of a hydrogen generator of the fuel cell system shown in FIG. 1.

FIG. 2 is a cross-sectional view showing a schematic configuration of the hydrogen generator of the fuel cell system shown in FIG. 1.

As shown in FIG. 2, the hydrogen generator 50 has a concentric quadruple cylindrical shape. In the hydrogen generator 50, a first cylinder 21, a second cylinder 22, a third cylinder 23, and a fourth cylinder 24 are sequentially arranged in said order such that the first cylinder 21 is the innermost cylinder. It should be noted that the fourth cylinder 24 has a shoulder portion, such that the diameter of the upper part of the fourth cylinder 24 is greater than the diameter of the lower part of the fourth cylinder 24.

The combustor 12 is disposed within the first cylinder 21. Annular space between the first cylinder 21 and the second cylinder 22 forms a flue gas passage 25. Accordingly, the reformer 3 and the like are heated while the flue gas generated by the combustor 12 flows through the flue gas passage 25.

The reformer 3 is disposed in the lower part of annular space formed between the second cylinder 22 and the third cylinder 23. Space above the reformer 3 serves as an evaporator 26. Water supplied from the outside of the hydrogen generation apparatus 100 is heated and thereby transformed into steam in the evaporator 26. The steam is mixed with the raw material gas and supplied to the reformer 3.

The CO remover 4 is disposed in the upper part of annular space formed between the third cylinder 23 and the fourth cylinder 24. Specifically, a shift converter 4a and a selective oxidizer 4b are disposed in the upper part of the annular space, such that the shift converter 4a is positioned below the selective oxidizer 4b. Between the shift converter 4a and the selective oxidizer 4b, an air passage 27 through which air is supplied to the selective oxidizer 4b is connected.

Further, concentric fifth and sixth cylinders 28 and 29 are disposed outside of the fourth cylinder 24. The second desulfurizer 2 is disposed in annular space formed between the fifth cylinder 28 and the sixth cylinder 29. Piping forming the raw material gas supply passage 11 is provided in the second desulfurizer 2 so as to vertically penetrate the second desulfurizer 2. As a result, the raw material gas flowing through the raw material gas supply passage 11 is released to the lower part of the second desulfurizer 2. Then, the raw material gas flows from the lower part toward the upper part of the second desulfurizer 2. Thus, the raw material gas flows within the second desulfurizer 2 uniformly. The raw material gas is desulfurized in the second desulfurizer 2. The desulfurized raw material gas flows through the raw material gas supply passage 11, and is supplied to the evaporator 26.

The hydrogen generator 50 with the above-described configuration is designed such that when the temperature of the reformer 3 becomes a predetermined temperature (e.g., 550 to 700° C.), the temperature of the second desulfurizer 2 and the temperature of the CO remover 4 become predetermined temperatures (e.g., the temperature of the second desulfurizer 2 becomes 200 to 300° C.; the temperature of the shift converter 4a becomes 200 to 320° C.; and the temperature of the selective oxidizer 4b becomes 120 to 160° C.).

It should be noted that the reformer 3 and the like may be heated not only by the heat from the flue gas generated by the combustor 12, but also by operating a heater that may be disposed around the reformer 3 and the like.

As mentioned above, the reduction reaction caused by hydrogen in the second desulfurizer 2 is an exothermic reaction. Therefore, the temperature of the second desulfurizer 2 increases in accordance with an increase in the amount of hydrogen supplied to the second desulfurizer 2. Meanwhile, the desulfurization agent has an upper limit temperature (in the case of a Cu—Zn catalyst, 300° C.). Therefore, the recycle passage 6 is configured such that the hydrogen supplied to the second desulfurizer 2 through the recycle passage 6 will not be in an amount that causes the temperature of the desulfurization agent to exceed the upper limit temperature. Specifically, for example, a flow rate adjusting valve, an orifice, or the like is provided on the recycle passage 6, and the flow rate of the fuel gas flowing through the recycle passage 6 is adjusted.

[Operations of Hydrogen Generation Apparatus and Fuel Cell System]

Next, operations of the hydrogen generation apparatus 100 according to Embodiment 1 and the fuel cell system 200 including the hydrogen generation apparatus 100 according to Embodiment 1 are described with reference to FIG. 1 and FIG. 2. It should be noted that a hydrogen generation operation of the hydrogen generation apparatus 100 according to Embodiment 1 is performed in the same manner as a hydrogen generation operation of a general hydrogen generation apparatus, and a power generation operation of the fuel cell system 200 is performed in the same manner as a power generation operation of a general fuel cell system. Therefore, a detailed description of these operations is omitted.

In the hydrogen generation apparatus 100 according to Embodiment 1, a Cu—Zn catalyst is used as the desulfurization agent of the second desulfurizer 2. At first, the catalyst loaded in the hydrogen generation apparatus 100 is in a non-reduced state. At the time of installation, the hydrogen generation apparatus 100 and the fuel cell system 200 including the hydrogen generation apparatus 100 are loaded with the non-reduced catalyst.

After the installation of the hydrogen generation apparatus 100 and the fuel cell system 200, at the start of the power generation operation of the fuel cell system 200, the controller 9 controls the switch 7 to cause the raw material gas to flow through the first desulfurizer 1. As a result, sulfur compounds contained in the raw material gas are adsorbed by the first desulfurizer 1.

The raw material gas thus desulfurized by the first desulfurizer 1 flows through the raw material gas supply passage 11, and is supplied to the reformer 3. In the reformer 3, a reformed gas is generated through a reforming reaction between the raw material gas and separately supplied steam. The generated reformed gas is supplied to the CO remover 4. In the CO remover 4, CO contained in the reformed gas is reduced to a level of approximately several ppm, and thereby a fuel gas is generated.

The generated fuel gas flows through the fuel gas supply passage 13, and is supplied to the fuel cell 101. Part of the fuel gas flowing through the fuel gas supply passage 13 (hereinafter, referred to as a recycle gas) flows through the recycle passage 6, and is mixed into the raw material gas flowing through the raw material gas supply passage 11, and is supplied to the second desulfurizer 2.

The fuel gas (hydrogen gas) supplied to the second desulfurizer 2 reduces (activates) the non-reduced Cu—Zn catalyst in the second desulfurizer 2. When the controller 9 determines that a predetermined amount of the Cu—Zn catalyst in the second desulfurizer 2 (e.g., 50% or more, preferably 70% or more, of the entire amount of the Cu—Zn catalyst) or the entire amount of the Cu—Zn catalyst in the second desulfurizer 2 has been reduced, the controller 9 controls the switch 7 such that the raw material gas flows through the bypass line 5 (i.e., flows in a manner to bypass the first desulfurizer 1) and is supplied to the second desulfurizer 2.

The switching, by the switch 7, of the supply destination of the raw material gas may be performed when at least one of a cumulative value indicating an accumulated supply amount of the raw material gas supplied to the hydrogen generation apparatus 100, a cumulative value indicating an accumulated supply time of the raw material gas supplied to the hydrogen generation apparatus 100, and a cumulative value indicating an accumulated operating time of the hydrogen generation apparatus has become greater than or equal to a corresponding predetermined first threshold. It should be noted that the first threshold is set based on operating conditions of the hydrogen generation apparatus 100.

For example, since the flow rate of the raw material gas substantially determines the amount of hydrogen in the fuel gas (reformed gas) generated by the hydrogen generator 50 (reformer 3), the amount of hydrogen in the generated gas can be calculated by measuring the flow rate of the raw material gas at the raw material gas supply device 8 and obtaining its cumulative value. Accordingly, the amount of hydrogen flowing through the recycle passage 6 can be estimated and the amount of hydrogen that has been supplied to the second desulfurizer 2 can be obtained. The amount of hydrogen that has been supplied to the second desulfurizer 2 determines the state of reduction of the desulfurization agent of the second desulfurizer 2. For this reason, whether the catalyst in the second desulfurizer 2 has been reduced sufficiently can be determined by obtaining a total amount of hydrogen that has been supplied to the second desulfurizer 2. Therefore, the controller 9 may cause the switch 7 to switch the supply destination of the raw material gas when the cumulative value indicating an accumulated supply amount of the raw material gas supplied to the hydrogen generation apparatus 100 has become greater than or equal to the first threshold, the first threshold indicating such an accumulated supply amount as to allow the catalyst in the second desulfurizer 2 to be sufficiently reduced.

If it can be confirmed whether the raw material gas is flowing, then an estimate can be made about, at least, how much amount the raw material gas has flowed, even without directly measuring the flow rate of the raw material gas at the raw material gas supply device 8. The estimate can be made by accumulating, by the controller 9, a time during which the raw material gas flows. Accordingly, similar to the above, the amount of hydrogen that has been supplied to the second desulfurizer 2 can be obtained by obtaining the cumulative value indicating an accumulated supply time of the raw material gas supplied to the hydrogen generation apparatus 100. Therefore, the controller 9 may cause the switch 7 to switch the supply destination of the raw material gas when the cumulative value indicating an accumulated supply time of the raw material gas supplied to the hydrogen generation apparatus 100 has become greater than or equal to the first threshold, the first threshold indicating such an accumulated supply time as to allow the catalyst in the second desulfurizer 2 to be sufficiently reduced.

A time during which the raw material gas flows is substantially equal to an operating time of the hydrogen generation apparatus 100 if a time from when a start-up command for starting up the hydrogen generation apparatus 100 has been inputted to the controller 9 to when a warm-up operation and the like (e.g., an operation of heating the second desulfurizer 2 and the like by means of a heater) have been performed is subtracted from the operating time of the hydrogen generation apparatus 100. The length of time necessary for the warm-up operation can be estimated in advance. Accordingly, the amount of hydrogen that has been supplied to the second desulfurizer 2 can be obtained by obtaining the cumulative value indicating an accumulated operating time of the hydrogen generation apparatus 100 while taking account of the time for the warm-up operation and the like. Therefore, the controller 9 may cause the switch 7 to switch the supply destination of the raw material gas when the cumulative value indicating an accumulated operating time of the hydrogen generation apparatus 100 has become greater than or equal to the first threshold, the first threshold indicating such an accumulated operating time as to allow the catalyst in the second desulfurizer 2 to be sufficiently reduced.

As one specific example, assume that the volume of the Cu—Zn catalyst in the second desulfurizer 2 is 2 L and the amount of hydrogen gas necessary for reducing 1 L of the Cu—Zn catalyst is 200 L, and also assume that the flow rate of the recycle gas flowing through the recycle passage 6 is 300 mL/min and the amount of hydrogen gas in 300 mL of the recycle gas is 200 mL when the flow rate of the raw material gas is 3 L/min in the hydrogen generation apparatus 100 shown in FIG. 1 and FIG. 2.

In order to fully reduce the Cu—Zn catalyst in the second desulfurizer 2 under the above operating conditions of the hydrogen generation apparatus 100, the following time is necessary: 400(L)/0.2(L/min)/60(min)=33.3(h).

Accordingly, the first threshold for the cumulative value indicating an accumulated supply time of the raw material gas supplied to the hydrogen generation apparatus 100 is 33.3 h (≈34 h). Also, the first threshold for the cumulative value indicating an accumulated supply amount of the raw material gas supplied to the hydrogen generation apparatus 100 is 3(L/min)×33.3(h)×60(min/h)=5994 L.

Moreover, if it is assumed that the warm-up operation requires 0.4 h, and start-up and stop are performed five times while the raw material gas is supplied for 34 h, then the first threshold for the cumulative value indicating an accumulated operating time of the hydrogen generation apparatus 100 is 34(h)+0.4(h)×5=36 h.

As described above, the first thresholds may be suitably set based on the operating conditions of the hydrogen generation apparatus 100, for example, based on the volume of the Cu—Zn catalyst in the second desulfurizer 2, the flow rates of the raw material gas and the recycle gas, and the hydrogen gas content in the recycle gas.

The hydrogen generation apparatus 100 according to Embodiment 1 and the fuel cell system 200 including the hydrogen generation apparatus 100 according to Embodiment 1 are configured as described above. The Cu—Zn catalyst of the second desulfurizer 2 is loaded into the hydrogen generation apparatus 100 without being reduced, and after the installation of the hydrogen generation apparatus 100, the Cu—Zn catalyst is reduced while the hydrogen generation apparatus 100 is being used. This makes it possible to lower costs compared to a conventional hydrogen generation apparatus and a fuel cell system including the conventional hydrogen generation apparatus in which the catalyst is reduced before the installation.

It should be noted that the above 'cumulative value indicating an accumulated raw material gas flow rate', 'cumulative value indicating an accumulated raw material gas flowing time', and 'cumulative value indicating an accumulated operating time' are values which start to be accumulated when the hydrogen generation apparatus starts to be used after the production of the hydrogen generation apparatus. These values may start to be accumulated when the hydrogen generation apparatus starts to be operated for the first time after the apparatus is installed in an actual usage location, or may start to be accumulated when a trial operation of the hydrogen generation apparatus is performed for confirming the apparatus condition. The trial operation may be performed either before or after the hydrogen generation apparatus is installed in an actual usage location.

[Variation 1]

Described next is a variation of the hydrogen generation apparatus 100 according to Embodiment 1 and the fuel cell system 200 including the hydrogen generation apparatus 100 according to Embodiment 1.

A hydrogen generation apparatus according to Variation 1 of Embodiment 1 and a fuel cell system including the hydrogen generation apparatus according to Variation 1 serve as an example where the hydrogen generation apparatus and the fuel cell system are configured such that the raw material gas is supplied to the reformer through the second desulfurizer when at least one of a cumulative value indicating an accumulated amount of electricity generated by the fuel cell system and a cumulative value indicating an accumulated electricity generation time of the fuel cell system has become greater than or equal to a corresponding predetermined third threshold. It should be noted that the configurations of the hydrogen generation apparatus 100 according to Variation 1 and the fuel cell system 200 including the hydrogen generation apparatus 100 according to Variation 1 are the same as those of the hydrogen generation apparatus 100 according to Embodiment 1 and the fuel cell system 200 including the hydrogen generation apparatus 100 according to Embodiment 1. Therefore, a detailed description of the configurations of the hydrogen generation apparatus 100 and the fuel cell system 200 is omitted.

[Operations of Hydrogen Generation Apparatus and Fuel Cell System]

As described above, the amount of hydrogen in the fuel gas can be calculated from the cumulative value indicating an accumulated raw material gas flow rate, and also, the amount of electricity generated by the fuel cell system 200 can be calculated from the amount of hydrogen. Therefore, the controller 9 may cause the switch 7 to switch the supply destination of the raw material gas when a cumulative value indicating an accumulated amount of electricity generated by the fuel cell system 200 has become greater than or equal to a third threshold, the third threshold indicating such an accumulated electricity generation amount as to allow the catalyst in the second desulfurizer 2 to be sufficiently reduced.

It should be noted that the controller 9 may obtain the amount of electricity generated by the fuel cell system 200 from a power conditioner which is not shown in FIG. 1 and FIG. 2. The third threshold can be calculated based on the first threshold.

The operating time of the hydrogen generation apparatus 100 is substantially the same as the operating time of the fuel cell system 200. Therefore, the controller 9 may cause the switch 7 to switch the supply destination of the raw material gas when a cumulative value indicating an accumulated operating time of the fuel cell 200 has become greater than or equal to a third threshold, the third threshold indicating such an accumulated operating time as to allow the catalyst in the second desulfurizer 2 to be sufficiently reduced.

The hydrogen generation apparatus 100 according to Variation 1 and the fuel cell system 200 including the hydrogen generation apparatus 100 according to Variation 1 with the above-described configurations provide the same operational advantages as those provided by the hydrogen generation apparatus 100 according to Embodiment 1 and the fuel cell system 200 including the hydrogen generation apparatus 100 according to Embodiment 1.

(Embodiment 2)

A hydrogen generation apparatus according to Embodiment 2 serves as an example where the hydrogen generation apparatus includes a temperature detector configured to detect a temperature of the second desulfurizer, and the hydrogen generation apparatus is configured such that the raw material gas is supplied to the reformer through the second desulfurizer when the temperature of the second desulfurizer detected by the temperature detector has become higher than or equal to a predetermined first temperature.

The hydrogen generation apparatus according to Embodiment 2 includes: a switch configured to switch a supply destination of the raw material gas between the first desulfurizer and the second desulfurizer; and a controller. The hydrogen generation apparatus according to 2 may be designed such that the temperature of the second desulfurizer becomes a predetermined third temperature while the hydrogen generation apparatus is operating. The controller may be configured such that after installation or maintenance of the hydrogen generation apparatus, the controller controls the switch to supply the raw material gas to the first desulfurizer and to cause the second desulfurizer to be reduced by the reformed gas until the temperature detected by the temperature detector has become higher than or equal to the first temperature which is higher than the third temperature.

A hydrogen generation apparatus operating method according to Embodiment 2 is a method of operating a hydrogen generation apparatus including: a first desulfurizer configured to remove a sulfur component from a raw material gas at a normal temperature; a second desulfurizer configured to remove the sulfur component from the raw material gas by hydrogenating the sulfur component; a reformer configured to reform water and the raw material gas from which sulfur has been removed by at least one of the first desulfurizer and the second desulfurizer into a hydrogen-containing reformed gas by using a reforming catalyst; a recycle passage through which a part of the reformed gas from the reformer is mixed into the raw material gas that is to be supplied to the second desulfurizer; and a temperature detector configured to detect a temperature of the second desulfurizer. The hydrogen generation apparatus is designed such that the temperature of the second desulfurizer becomes a predetermined third temperature while the hydrogen generation apparatus is operating. The method includes the steps of: mounting the second desulfurizer including a non-reduced catalyst in the hydrogen generation apparatus; installing the hydrogen generation apparatus; and after the hydrogen generation apparatus is installed, supplying the raw material gas to the first desulfurizer and reducing the second desulfurizer by the reformed gas until the temperature detected by the temperature detector has become higher than or equal to a first temperature which is higher than the third temperature.

[Configuration of Fuel Cell System]

Figure 3:
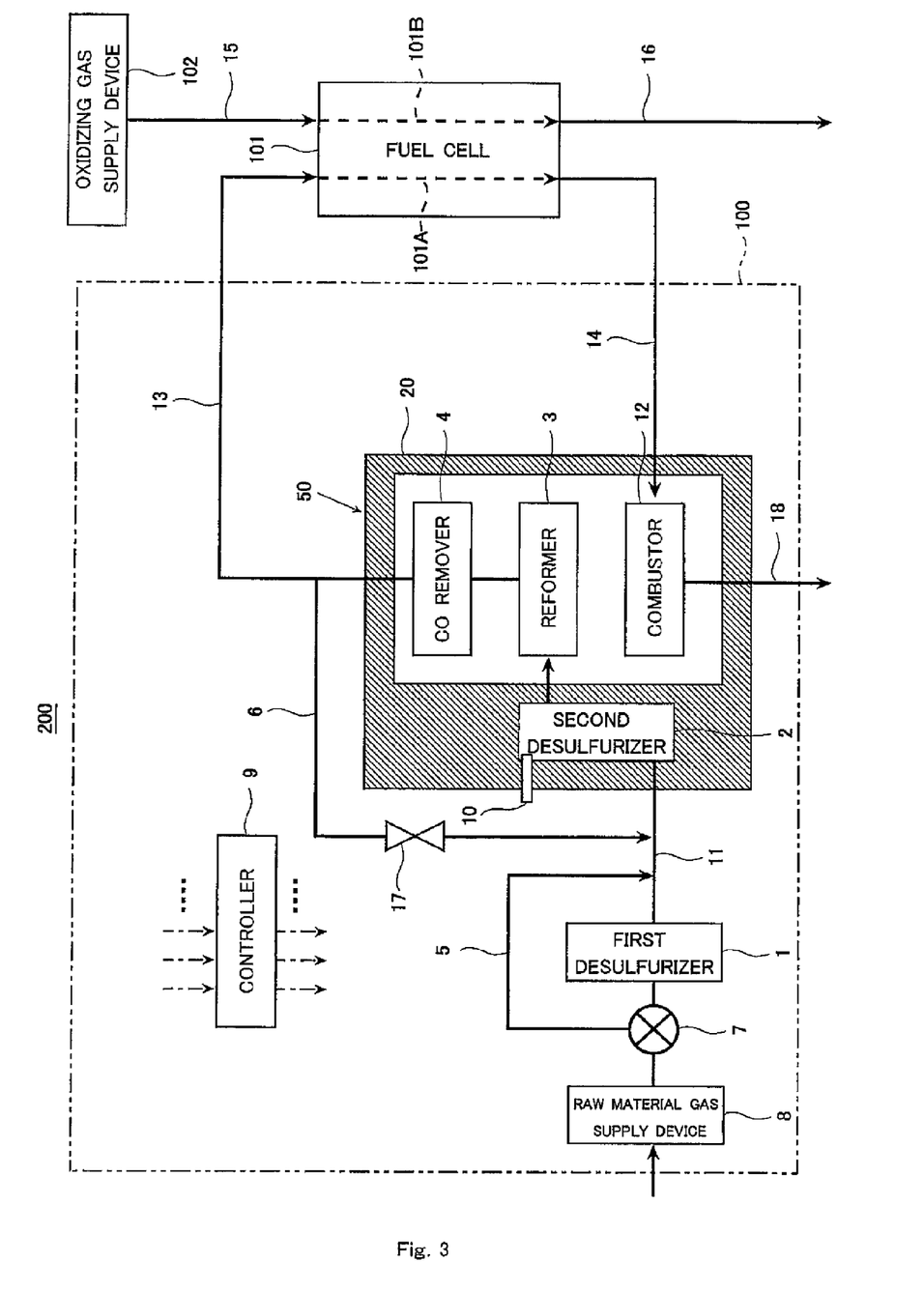
FIG. 3 is a block diagram schematically showing the configuration of a fuel cell system including a hydrogen generation apparatus according to Embodiment 2.

FIG. 3 is a block diagram schematically showing the configuration of a fuel cell system including the hydrogen generation apparatus according to Embodiment 2.

As shown in FIG. 3, the fundamental configurations of the hydrogen generation apparatus 100 according to Embodiment 2 and the fuel cell system 200 including the hydrogen generation apparatus 100 according to Embodiment 2 are the same as those of the hydrogen generation apparatus 100 according to Embodiment 1 and the fuel cell system 200 including the hydrogen generation apparatus 100 according to Embodiment 1. However, there is a difference in that the hydrogen generation apparatus 100 according to Embodiment 2 and the fuel cell system 200 including the hydrogen generation apparatus 100 according to Embodiment 2 include a temperature detector 10 configured to detect the temperature of the second desulfurizer 2.

The temperature detector 10 is configured to directly detect the surface temperature of the fifth cylinder 28 or the sixth cylinder 29 forming the second desulfurizer 2, or the temperature of the Cu—Zn catalyst in the second desulfurizer 2, and to output the detected temperature to the controller 9. For example, a temperature sensor such as a thermocouple or a thermistor can be used as the temperature detector 10.

[Operations of Hydrogen Generation Apparatus and Fuel Cell System]

Next, operations of the hydrogen generation apparatus 100 according to Embodiment 2 and the fuel cell system 200 including the hydrogen generation apparatus 100 according to Embodiment 2 are described with reference to FIG. 3 and FIG. 4. It should be noted that a hydrogen generation operation of the hydrogen generation apparatus 100 according to Embodiment 2 is performed in the same manner as a hydrogen generation operation of a general hydrogen generation apparatus, and a power generation operation of the fuel cell system 200 is performed in the same manner as a power generation operation of a general fuel cell system. Therefore, a detailed description of these operations is omitted.

As described above, the hydrogen generation apparatus 100 (hydrogen generator 50) is designed such that the temperature of the second desulfurizer 2 becomes 200 to 300° C. (third temperature) when the temperature of the reformer 3 becomes a predetermined temperature (e.g., 550 to 700° C.). Further, when the Cu—Zn catalyst in the second desulfurizer 2 is reduced, heat is generated and the temperature of the second desulfurizer 2 increases, accordingly.

Hereinafter, with reference to FIG. 4, a description is given of the temperature state of the second desulfurizer 2 at a time when the Cu—Zn catalyst in the second desulfurizer 2 is reduced.

Figure 4:
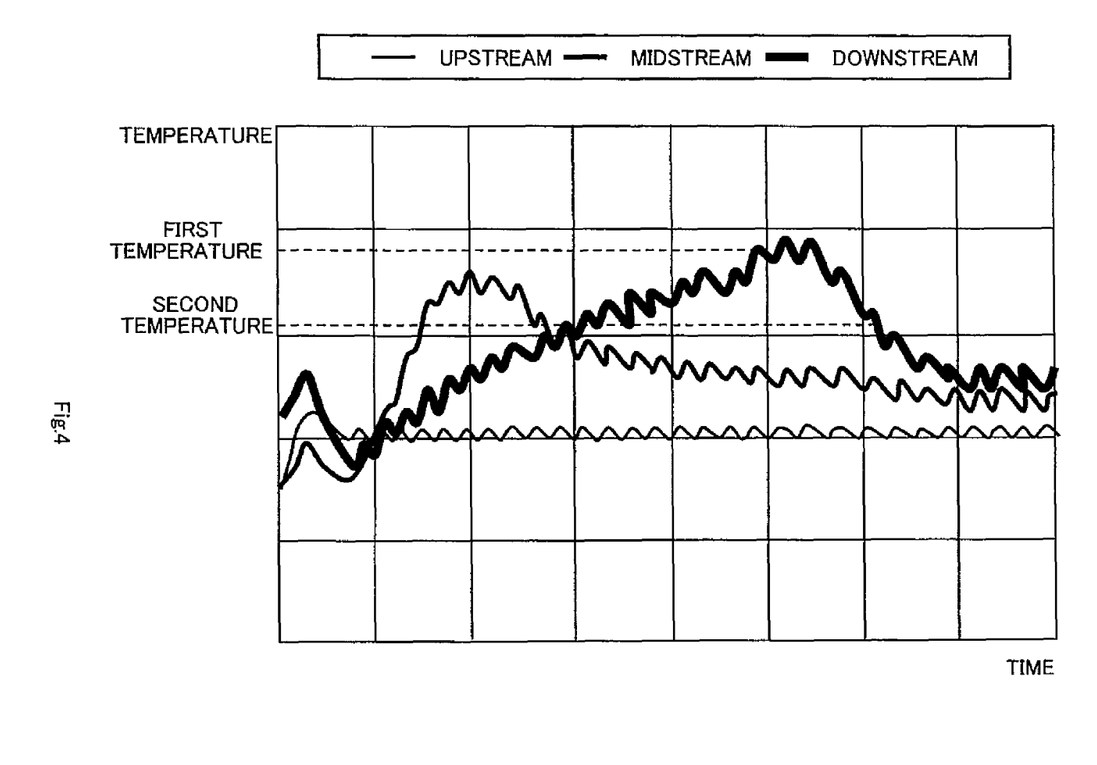
FIG. 4 is a graph in which temperatures detected by a temperature detector disposed at an upstream part of a second desulfurizer, a temperature detector disposed at a midstream part of the second desulfurizer, and a temperature detector disposed at a downstream part of the second desulfurizer are plotted.

FIG. 4 is a graph in which temperatures detected by a temperature detector disposed at an upstream part of the second desulfurizer, a temperature detector disposed at a midstream part of the second desulfurizer, and a temperature detector disposed at a downstream part of the second desulfurizer are plotted. It should be noted that a second temperature in FIG. 4 will be described below.

FIG. 4 shows results obtained under the conditions described below. In the hydrogen generator 50 shown in FIG. 2, a heater is disposed around the upstream part of the second desulfurizer 2, and the second desulfurizer 2 is heated through ON-OFF control of the heater, such that the temperature detected by the upstream temperature detector becomes a fixed temperature value. The temperatures plotted in FIG. 4 are those detected by the temperature detectors in a situation where: the flue gas generated by the combustor 12 heats up the entire hydrogen generator 50; and the recycle gas is supplied to the second desulfurizer 2 and thereby catalyst reduction of the second desulfurizer 2 is performed.

As shown in FIG. 4, the temperature in the second desulfurizer 2 changes such that, first, the temperature of the midstream part increases, and then the temperature of the downstream part increases. The temperatures of the midstream part and the downstream part both decrease after increasing.

The reason for this is as follows: when the recycle gas is supplied and thereby the catalyst is reduced, reaction heat is generated at a part where the reduction occurs and thereby a local temperature increase occurs at the part; and when the catalyst is fully reduced, no more reduction occurs even if hydrogen is supplied, and the reaction heat is no longer generated, which results in a temperature decrease.

When the catalyst is fully reduced, hydrogen is no longer consumed at the part. As a result, the recycle gas containing a sufficient amount of hydrogen flows toward the downstream side, and catalyst reduction occurs at the downstream side. For this reason, the temperature of the downstream side increases after the temperature has increased at the upstream side.

Accordingly, in a case where the hydrogen generation apparatus 100 is designed such that the temperature of the second desulfurizer 2 becomes the predetermined third temperature (e.g., 250° C.) while the hydrogen generation apparatus 100 is operating, it can be determined that the Cu—Zn catalyst in the second desulfurizer 2 has been sufficiently reduced when the temperature detected by the temperature detector 10 has become higher than or equal to a first temperature (e.g., 260 to 280° C.) which is higher than the third temperature. Therefore, the controller 9 may cause the switch 7 to switch the supply destination of the raw material gas when the temperature detected by the temperature detector 10 has become higher than or equal to the first temperature which is higher than the third temperature.

It should be noted that the first temperature may be a fixed value (e.g., 270° C.) or may be set based on the operating conditions of the hydrogen generation apparatus 100, and may be set in advance based on an experiment or the like. For example, the first temperature may be set to a fixed value in a case where a heater is disposed around the second desulfurizer 2 and the heater is controlled such that the temperature of the second desulfurizer 2 is kept to a predetermined value.

It is preferred that the first temperature is set based on the operating conditions of the hydrogen generation apparatus 100 in a case where the temperature of the second desulfurizer 2 varies depending on the operating conditions of the hydrogen generation apparatus 100. For example, the hydrogen generation apparatus 100 including the hydrogen generator 50 shown in FIG. 2 is designed such that the temperature of the second desulfurizer 2 becomes a predetermined temperature when the temperature of the reformer 3 becomes a predetermined temperature due to heat from the flue gas generated by the combustor 12.

When the amount of fuel gas generated by the hydrogen generation apparatus 100 is increased (i.e., when the amount of electricity generated by the fuel cell system 200 is increased), the flow rate and flow velocity of the raw material gas supplied to the hydrogen generation apparatus 100 are increased. Accordingly, the temperature of the second desulfurizer 2 becomes lower than the set predetermined temperature due to the raw material gas in the second desulfurizer 2 and the raw material gas in the raw material gas supply passage 11 inserted in the second desulfurizer 2.

On the other hand, when the amount of fuel gas generated by the hydrogen generation apparatus 100 is decreased (i.e., when the amount of electricity generated by the fuel cell system 200 is decreased), the flow rate and flow velocity of the raw material gas supplied to the hydrogen generation apparatus 100 are decreased. Accordingly, the temperature of the second desulfurizer 2 becomes higher than the set predetermined temperature.

Therefore, in a case where the fuel cell system 200 is operated under low-load conditions to reduce the Cu—Zn catalyst in the second desulfurizer 2 (e.g., the electricity generation amount under the low-load conditions is ⅓ of the electricity generation amount under the rated conditions), the first temperature may be set to a higher temperature than in a case where the fuel cell system 200 is operated under the rated conditions to reduce the Cu—Zn catalyst in the second desulfurizer 2. With such a setting, a more accurate determination that the Cu—Zn catalyst in the second desulfurizer 2 has been reduced sufficiently can be made.

Specifically, for example, the first temperature may be set to 240 to 260° C. in a case where the fuel cell system 200 is operated under the rated conditions, and the first temperature may be set to 270 to 280° C. in a case where the fuel cell system 200 is operated under the low-load conditions (e.g., the electricity generation amount under the low-load conditions is ⅓ of the electricity generation amount under the rated conditions).

It should be noted that, by means of the temperature detector 10, it can be detected whether the catalyst in a part of the second desulfurizer 2, the part being upstream from the position where the temperature detector 10 is disposed, has been reduced. Therefore, preferably, the temperature detector 10 is configured to detect the temperature of a downstream part of the second desulfurizer 2. For example, referring to FIG. 2, the downstream part of the second desulfurizer 2 herein is an area between the downstream end of the second desulfurizer 2 and a position that is away (upward) from the upstream end of the second desulfurizer 2 by ½ of the vertical length of the second desulfurizer 2.

The catalyst that is disposed downstream from the temperature detector 10 is not fully reduced when the temperature detector 10 detects the first temperature. By continuing the operation of the hydrogen generation apparatus 100 thereafter, the recycle gas is supplied to the second desulfurizer 2 and the catalyst disposed downstream from the temperature detector 10 is reduced.

The hydrogen generation apparatus 100 according to Embodiment 2 and the fuel cell system 200 including the hydrogen generation apparatus 100 according to Embodiment 2 with the above-described configurations provide the same operational advantages as those provided by the hydrogen generation apparatus 100 according to Embodiment 1 and the fuel cell system 200 including the hydrogen generation apparatus 100 according to Embodiment 1.

[Variation 1]

Described next is a variation of the hydrogen generation apparatus 100 according to Embodiment 2 and the fuel cell system 200 including the hydrogen generation apparatus 100 according to Embodiment 2.

A hydrogen generation apparatus according to Variation 1 of Embodiment 2 serves as an example where the hydrogen generation apparatus is configured such that the raw material gas is supplied to the reformer through the second desulfurizer when the temperature of the second desulfurizer detected by the temperature detector has become lower than or equal to a second temperature which is lower than the predetermined first temperature after the temperature of the second desulfurizer detected by the temperature detector has become higher than or equal to the first temperature. It should be noted that the configurations of the hydrogen generation apparatus 100 according to Variation 1 and the fuel cell system 200 including the hydrogen generation apparatus 100 according to Variation 1 are the same as those of the hydrogen generation apparatus 100 according to Embodiment 2 and the fuel cell system 200 including the hydrogen generation apparatus 100 according to Embodiment 2. Therefore, a detailed description of the configurations of the hydrogen generation apparatus 100 and the fuel cell system 200 is omitted.

[Operations of Hydrogen Generation Apparatus and Fuel Cell System]

As described above, the temperature in the second desulfurizer 2 decreases after increasing (see FIG. 4). Accordingly, a more accurate determination that the Cu—Zn catalyst in the second desulfurizer 2 has been reduced sufficiently can be made when the temperature detector 10 has detected a temperature lower than or equal to a second temperature which is lower than the first temperature after detecting a temperature higher than or equal to the first temperature.

The wording, "when the temperature detector 10 has detected a temperature lower than or equal to a second temperature which is lower than the first temperature after detecting a temperature higher than or equal to the first temperature", refers to a point in time during the operation of the hydrogen generation apparatus 100 (i.e., during the power generation operation of the fuel cell system 200; during the fuel gas generation by the hydrogen generation apparatus 100), and excludes a case where the temperature detector 10 has detected the second temperature during a start-up process of the hydrogen generation apparatus 100 and a case where the temperature detector 10 has detected the second temperature during a stop period (including a stop process) of the hydrogen generation apparatus 100.

Therefore, the controller 9 may cause the switch 7 to switch the supply destination of the raw material gas when the temperature detector 10 has detected a temperature lower than or equal to the second temperature after detecting a temperature higher than or equal to the first temperature. It should be noted that since the second temperature is the temperature of the second desulfurizer 2 while the hydrogen generation apparatus 100 is operating, the second temperature is higher than or equal to the third temperature.

The second temperature may be a fixed value (e.g., 240° C.) or may be set based on the operating conditions of the hydrogen generation apparatus 100, and may be set in advance based on an experiment or the like. Similar to the first temperature, in a case where the temperature of the second desulfurizer 2 varies depending on the operating conditions of the hydrogen generation apparatus 100, a more accurate determination that the Cu—Zn catalyst in the second desulfurizer 2 has been reduced sufficiently can be made with the following setting: the second temperature is set to a higher temperature in a case where the fuel cell system 200 is operated under low-load conditions (e.g., the electricity generation amount under the low-load conditions is ⅓ of the electricity generation amount under the rated conditions) than in a case where the fuel cell system 200 is operated under the rated conditions Specifically, for example, the second temperature may be set to 200 to 230° C. in a case where the fuel cell system 200 is operated under the rated conditions, and the second temperature may be set to 240 to 250° C. in a case where the fuel cell system 200 is operated under the low-load conditions (e.g., the electricity generation amount under the low-load conditions is ⅓ of the electricity generation amount under the rated conditions).

The hydrogen generation apparatus 100 according to Variation 1 and the fuel cell system 200 including the hydrogen generation apparatus 100 according to Variation 1 with the above-described configurations provide the same operational advantages as those provided by the hydrogen generation apparatus 100 according to Embodiment 2 and the fuel cell system 200 including the hydrogen generation apparatus 100 according to Embodiment 2.

[Variation 2]

A hydrogen generation apparatus according to Variation 2 of Embodiment 2 serves as an example where the hydrogen generation apparatus is configured such that the raw material gas is supplied to the reformer through the second desulfurizer when at least one of a cumulative value indicating an accumulated supply amount of the raw material gas supplied to the hydrogen generation apparatus, a cumulative value indicating an accumulated supply time of the raw material gas supplied to the hydrogen generation apparatus, and a cumulative value indicating an accumulated operating time of the hydrogen generation apparatus has become greater than or equal to a corresponding predetermined second threshold after the temperature of the second desulfurizer detected by the temperature detector has become higher than or equal to the predetermined first temperature. It should be noted that the configurations of the hydrogen generation apparatus 100 according to Variation 2 and the fuel cell system 200 including the hydrogen generation apparatus 100 according to Variation 2 are the same as those of the hydrogen generation apparatus 100 according to Embodiment 2 and the fuel cell system 200 including the hydrogen generation apparatus 100 according to Embodiment 2. Therefore, a detailed description of the configurations of the hydrogen generation apparatus 100 and the fuel cell system 200 is omitted.

[Operations of Hydrogen Generation Apparatus and Fuel Cell System]

Operations of the hydrogen generation apparatus 100 according to Variation 2 and the fuel cell system 200 including the hydrogen generation apparatus 100 according to Variation 2 are fundamentally the same as those of the hydrogen generation apparatus 100 according to Variation 1 and the fuel cell system 200 including the hydrogen generation apparatus 100 according to Variation 1. However, there is a difference regarding an operation that is performed after the temperature detector 10 has detected the first temperature. To be specific, the raw material gas is supplied to the reformer 3 through the second desulfurizer 2 when at least one of a cumulative value indicating an accumulated supply amount of the raw material gas supplied to the hydrogen generation apparatus 100, a cumulative value indicating an accumulated supply time of the raw material gas supplied to the hydrogen generation apparatus 100, and a cumulative value indicating an accumulated operating time of the hydrogen generation apparatus 100 has become greater than or equal to a corresponding predetermined second threshold.

That is, in Variation 2, a timing at which the temperature detected by the temperature detector 10 becomes lower than or equal to the second temperature is determined based on at least one of the following values: the cumulative value indicating an accumulated supply amount of the raw material gas supplied to the hydrogen generation apparatus 100; the cumulative value indicating an accumulated supply time of the raw material gas supplied to the hydrogen generation apparatus 100; and the cumulative value indicating an accumulated operating time of the hydrogen generation apparatus 100. Accordingly, the second threshold can be set in advance through an experiment or the like. It should be noted that, similar to the second temperature, the second threshold may be set based on the operating conditions of the hydrogen generation apparatus 100.

The hydrogen generation apparatus 100 according to Variation 2 and the fuel cell system 200 including the hydrogen generation apparatus 100 according to Variation 2 with the above-described configurations provide the same operational advantages as those provided by the hydrogen generation apparatus 100 according to Variation 1 and the fuel cell system 200 including the hydrogen generation apparatus 100 according to Variation 1.

(Embodiment 3)

A hydrogen generation apparatus according to Embodiment 3 serves as an example where the hydrogen generation apparatus includes: the temperature detector configured to detect a temperature of the second desulfurizer; and a bypass passage configured to supply the raw material gas to the second desulfurizer in a manner to bypass the first desulfurizer, and the hydrogen generation apparatus is configured such that after the second desulfurizer is activated, if the temperature detected by the temperature detector is lower than the third temperature which is lower than the first temperature, the raw material gas is supplied to the first desulfurizer, and if the temperature detected by the temperature detector has become the third temperature, the raw material gas is supplied to the second desulfurizer through the bypass passage. It should be noted that since the configurations of the hydrogen generation apparatus 100 according to Embodiment 3 and the fuel cell system 200 including the hydrogen generation apparatus 100 according to Embodiment 3 are the same as those of the hydrogen generation apparatus 100 according to Embodiment 2 and the fuel cell system 200 including the hydrogen generation apparatus 100 according to Embodiment 2. Therefore, a detailed description of the configurations of the hydrogen generation apparatus 100 and the fuel cell system 200 is omitted.

[Operations of Hydrogen Generation Apparatus and Fuel Cell System]

As described above, the hydrogen generation apparatus 100 (hydrogen generator 50) is designed such that the temperature of the second desulfurizer 2 becomes the third temperature when the temperature of the reformer 3 becomes a predetermined temperature. It should be noted that the third temperature is such a temperature range as to allow the Cu—Zn catalyst in the second desulfurizer 2 to desulfurize the sulfur compounds in the raw material gas.

Accordingly, after the second desulfurizer 2 is activated, when the temperature of the second desulfurizer 2 has become the third temperature, it means that the reformed gas (hydrogen gas) is sufficiently generated in the reformer 3 and the sulfur compounds in the raw material gas can be desulfurized by the second desulfurizer 2. On the other hand, when the temperature of the second desulfurizer 2 is lower than the third temperature, the sulfur compounds in the raw material gas cannot be desulfurized even if the return gas is supplied to the second desulfurizer 2.

Therefore, the controller 9 controls the switch 7 such that after the second desulfurizer 2 is activated, when the temperature of the second desulfurizer 2 is lower than the third temperature, the raw material gas is supplied to the first desulfurizer 1 so that sulfur compounds are desulfurized by the first desulfurizer 1, and when the temperature of the second desulfurizer 2 has become the third temperature, the raw material gas is supplied to the second desulfurizer 2.

The hydrogen generation apparatus 100 according to Embodiment 3 and the fuel cell system 200 including the hydrogen generation apparatus 100 according to Embodiment 3 with the above-described configurations provide the same operational advantages as those provided by the hydrogen generation apparatus 100 according to Embodiment 2 and the fuel cell system 200 including the hydrogen generation apparatus 100 according to Embodiment 2.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention. In addition, various inventions can be made by suitable combinations of a plurality of components disclosed in the above embodiments.

Industrial Applicability

The hydrogen generation apparatus, the fuel cell system including the hydrogen generation apparatus, and the method of operating the hydrogen generation apparatus, according to the present invention, allow a reduction treatment step to be eliminated from the production of a compact hydrogen generation apparatus in which a desulfurization agent requiring a reduction treatment is used. Thus, the hydrogen generation apparatus, the fuel cell system including the hydrogen generation apparatus, and the method of operating the hydrogen generation apparatus realize cost reduction and are useful in the field of fuel cell technology.

REFERENCE SIGNS LIST 1 first desulfurizer
2 second desulfurizer
3 reformer
4 CO remover
4a shift converter
4b selective oxidizer
5 bypass line
6 recycle passage
7 switch
8 raw material gas supply device
9 controller
10 temperature detector
11 raw material gas supply passage
12 combustor
13 fuel gas supply passage
14 fuel gas discharge passage
15 oxidizing gas supply passage
16 oxidizing gas discharge passage
17 on-off valve
18 flue gas passage
20 heat insulating material
21 first cylinder 22 second cylinder
23 third cylinder
24 fourth cylinder
25 flue gas passage
26 evaporator
27 air passage
28 fifth cylinder
29 sixth cylinder
50 hydrogen generator
100 hydrogen generation apparatus
101 fuel cell
101A fuel gas passage
101B oxidizing gas passage
102 oxidizing gas supply device
200 fuel cell system

The invention claimed is:

1. A hydrogen generation apparatus comprising:
a first desulfurizer configured to remove a sulfur component from a raw material gas at a normal temperature;
a second desulfurizer configured to remove the sulfur component from the raw material gas by hydrogenating the sulfur component;
a reformer configured to generate a hydrogen-containing reformed gas from the raw material gas from which the sulfur component has been removed by at least one of the first desulfurizer and the second desulfurizer; and
a recycle passage through which a part of the reformed gas generated by the reformer is mixed into the raw material gas that is to be supplied to the second desulfurizer, wherein
the hydrogen generation apparatus is configured such that
after installation or maintenance of the hydrogen generation apparatus, the raw material gas is supplied to the reformer through the first desulfurizer until a catalyst in the second desulfurizer is activated by a mixed gas of the reformed gas supplied through the recycle passage and the raw material gas, and
after the catalyst in the second desulfurizer is reduced by the reformed gas supplied through the recycle passage, the raw material gas is supplied to the reformer through the second desulfurizer.

2. the hydrogen generation apparatus according to claim 1, wherein
the hydrogen generation apparatus is configured such that the raw material gas is supplied to the reformer through the second desulfurizer when at least one of a cumulative value indicating an accumulated supply amount of the raw material gas supplied to the hydrogen generation apparatus, a cumulative value indicating an accumulated supply time of the raw material gas supplied to the hydrogen generation apparatus, and a cumulative value indicating an accumulated operating time of the hydrogen generation apparatus has become greater than or equal to a corresponding predetermined first threshold.

3. The hydrogen generation apparatus according to claim 1, comprising a temperature detector configured to detect a temperature of the second desulfurizer, wherein
the hydrogen generation apparatus is configured such that the raw material gas is supplied to the reformer through the second desulfurizer when the temperature of the second desulfurizer detected by the temperature detector has become higher than or equal to a predetermined first temperature.

4. The hydrogen generation apparatus according to claim 3, wherein
the hydrogen generation apparatus is configured such that the raw material gas is supplied to the reformer through the second desulfurizer when the temperature of the second desulfurizer detected by the temperature detector has become lower than or equal to a second temperature which is lower than the predetermined first temperature after the temperature of the second desulfurizer detected by the temperature detector has become higher than or equal to the first temperature.

5. The hydrogen generation apparatus according to claim 3, wherein
the hydrogen generation apparatus is configured such that the raw material gas is supplied to the reformer through the second desulfurizer when at least one of a cumulative value indicating an accumulated supply amount of the raw material gas supplied to the hydrogen generation apparatus, a cumulative value indicating an accumulated supply time of the raw material gas supplied to the hydrogen generation apparatus, and a cumulative value indicating an accumulated operating time of the hydrogen generation apparatus has become greater than or equal to a corresponding predetermined second threshold after the temperature of the second desulfurizer detected by the temperature detector has become higher than or equal to the predetermined first temperature.

6. The hydrogen generation apparatus according to claim 3, wherein the temperature detector is configured to detect a temperature of a downstream part of the second desulfurizer.

7. The hydrogen generation apparatus according to claim 2, wherein the first threshold is set based on an operating condition of the hydrogen generation apparatus.

8. The hydrogen generation apparatus according to claim 3, wherein the first temperature is set based on an operating condition of the hydrogen generation apparatus.

9. The hydrogen generation apparatus according to claim 4, wherein the second temperature is set based on an operating condition of the hydrogen generation apparatus.

10. The hydrogen generation apparatus according to claim 5, wherein the second threshold is set based on an operating condition of the hydrogen generation apparatus.

11. The hydrogen generation apparatus according to claim 1, comprising:
a temperature detector configured to detect a temperature of the second desulfurizer; and
a bypass passage configured to supply the raw material gas to the second desulfurizer in a manner to bypass the first desulfurizer, wherein
the hydrogen generation apparatus is configured such that after the catalyst in the second desulfurizer is activated, if the temperature detected by the temperature detector is lower than a third temperature which is lower than the first temperature, the raw material gas is supplied to the first desulfurizer, and if the temperature detected by the temperature detector has become the third temperature, the raw material gas is supplied to the second desulfurizer through the bypass passage.

12. A fuel cell system comprising the hydrogen generation apparatus according to claim 1, wherein
the fuel cell system is configured such that the raw material gas is supplied to the reformer through the second desulfurizer when at least one of a cumulative value indicating an accumulated amount of electricity generated by the fuel cell system and a cumulative value indicating an accumulated electricity generation time of the fuel cell system has become greater than or equal to a corresponding predetermined third threshold.

13. A fuel cell system comprising the hydrogen generation apparatus according to claim 1.

14. A method of operating a hydrogen generation apparatus,
the hydrogen generation apparatus including:
- a first desulfurizer configured to remove a sulfur component from a raw material gas at a normal temperature;
- a second desulfurizer configured to remove the sulfur component from the raw material gas by hydrogenating the sulfur component;
- a reformer configured to generate a reformed gas from the raw material gas from which the sulfur component has been removed by at least one of the first desulfurizer and the second desulfurizer; and
- a recycle passage through which a part of the reformed gas generated by the reformer is mixed into the raw material gas that is to be supplied to the second desulfurizer, the method comprising:
- supplying, after installation or maintenance of the hydrogen generation apparatus, the raw material gas to the reformer through the first desulfurizer until a catalyst in the second desulfurizer is activated by a mixed gas of the reformed gas supplied through the recycle passage and the raw material gas; and
- supplying, after the catalyst in the second desulfurizer is reduced by the reformed gas supplied through the recycle passage, the raw material gas to the reformer through the second desulfurizer.

* * * * *